(12) United States Patent
Hebbar et al.

(10) Patent No.: US 7,178,052 B2
(45) Date of Patent: Feb. 13, 2007

(54) HIGH AVAILABILITY VIRTUAL SWITCH

(75) Inventors: Hemant Hebbar, Milpitas, CA (US);
Sitaram Dontu, Sunnyvale, CA (US);
Madhuri Kolli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 10/666,887

(22) Filed: Sep. 18, 2003

(65) Prior Publication Data

US 2005/0066216 A1   Mar. 24, 2005

(51) Int. Cl.
*G06F 11/00* (2006.01)
*G06F 15/173* (2006.01)
*H04M 7/00* (2006.01)
(52) U.S. Cl. .................. 714/4; 379/221.04; 709/239
(58) Field of Classification Search .................... 718/1, 718/105; 379/221.14, 901, 221.04; 714/4, 714/43; 709/226, 239
See application file for complete search history.

(56) References Cited

U.S. PATENT DOCUMENTS

| | | | | |
|---|---|---|---|---|
| 5,473,599 A | * | 12/1995 | Li et al. ..................... | 370/219 |
| 6,108,300 A | | 8/2000 | Coile et al. ................. | 370/217 |
| 6,421,787 B1 | * | 7/2002 | Slaughter et al. ............ | 714/4 |
| 6,487,591 B1 | | 11/2002 | Budhraja et al. ........... | 709/223 |
| 6,674,713 B1 | | 1/2004 | Berg et al. .................. | 370/217 |
| 6,728,780 B1 | * | 4/2004 | Hebert ........................ | 709/239 |
| 6,938,095 B2 | | 8/2005 | Basturk et al. ............. | 709/238 |
| 2003/0037165 A1 | * | 2/2003 | Shinomiya .................. | 709/238 |
| 2003/0093557 A1 | * | 5/2003 | Giraud et al. ............... | 709/239 |
| 2004/0078621 A1 | * | 4/2004 | Talaugon et al. ............. | 714/4 |
| 2005/0265346 A1 | * | 12/2005 | Ho et al. .................... | 370/392 |

FOREIGN PATENT DOCUMENTS

| | | |
|---|---|---|
| EP | 1309135 | 5/2003 |
| WO | WO00/78004 | 12/2000 |

OTHER PUBLICATIONS

International Search Report and Written Opinion Of The International Searching Authority dated Aug. 2, 2005, for related PCT Application No. PCT/US2004/029554.
Knight S. et al., Virtual Router Redundancy Protocol IETF, Apr. 1998, 27 pages.
International Search Report, dated Jan. 14, 2005, from related International Application No. PCT/US2004/029553, including Notification of Transmittal, 4 pp.
Written Opinion of the International Searching Authority, dated Jan. 14, 2005, from related International Application No. PCT/US2004/029553, 6 pp.

* cited by examiner

*Primary Examiner*—Robert Beausoliel
*Assistant Examiner*—Christopher McCarthy
(74) *Attorney, Agent, or Firm*—Beyer Weaver & Thomas, LLP

(57) ABSTRACT

Method and devices are provided for implementing high availability. Some implementations provide high availability for virtual switches of data networks. Each virtual switch acts as a single logical unit, while encompassing at least two physical chassis, referred to herein as a master chassis and a slave chassis. In some preferred embodiments, the active supervisor in the master chassis is configured as an active supervisor of the virtual switch and the active supervisor in the slave chassis is configured as the standby supervisor of the virtual switch.

27 Claims, 10 Drawing Sheets

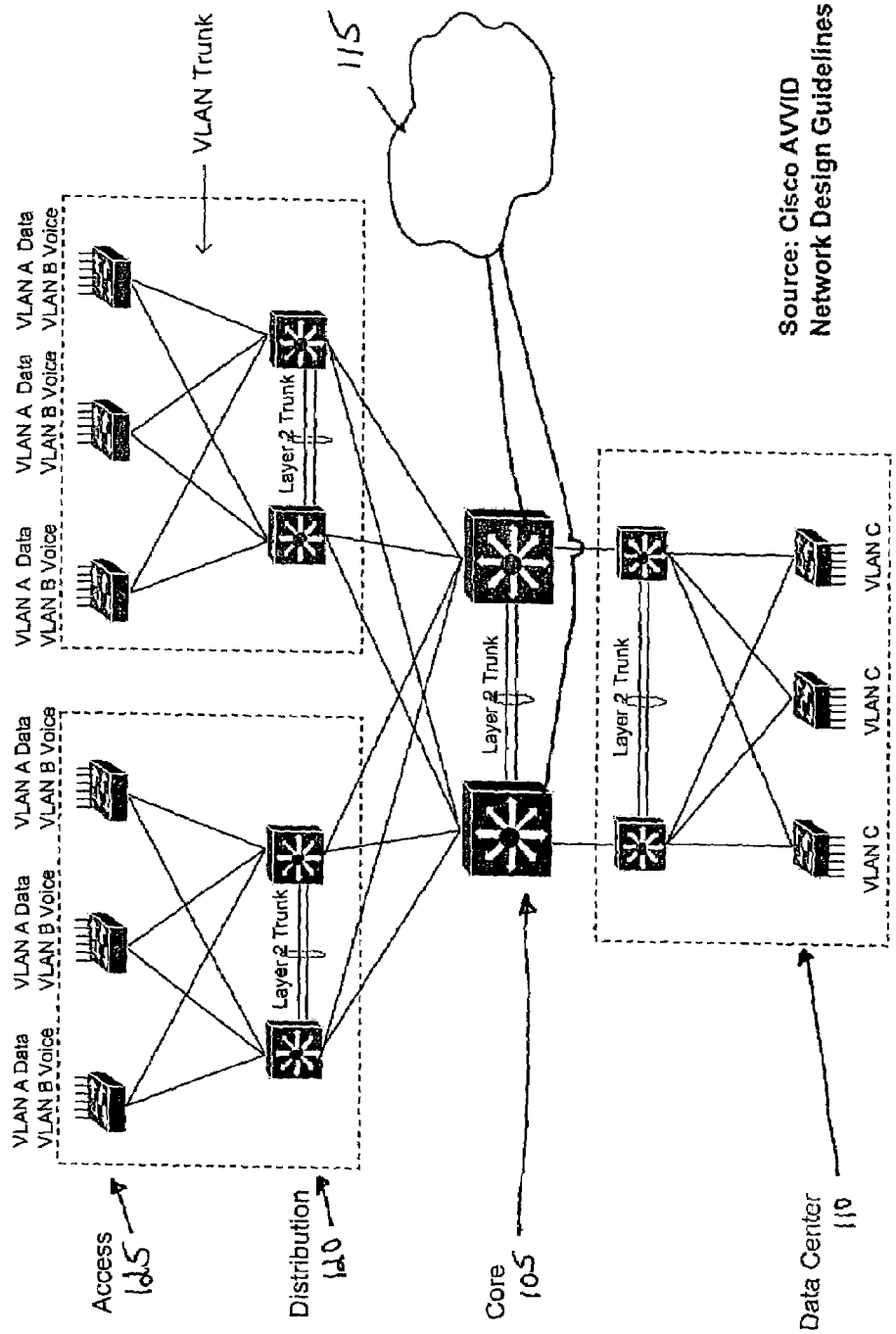

Virtual Distribution Switch

Physical View

Logical View

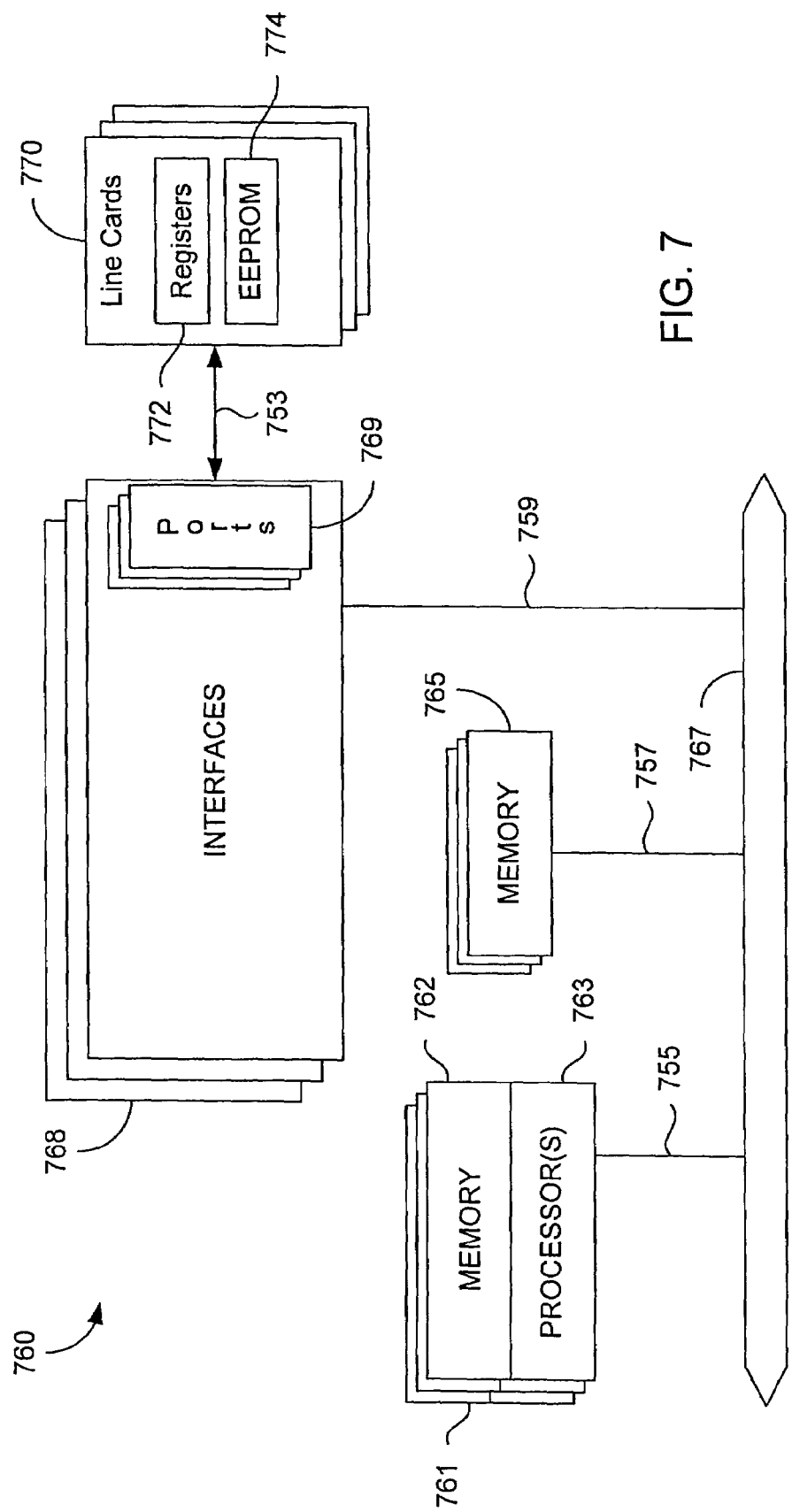

HIGH AVAILABILITY VIRTUAL SWITCH

CROSS-REFERENCE TO RELATED APPLICATION

This application is related to U.S. patent application Ser. No. 10/666,306, which application is hereby incorporated by reference for all purposes.

BACKGROUND OF THE INVENTION

1. Field of the Invention

The present invention relates to network technology. More particularly, the present invention relates to maintaining high availability of network devices.

2. Description of the Related Art

In most enterprise networks, a tiered network design is employed, with redundant network devices at various tiers. A typical network design is illustrated in FIG. 1. Core layer 105 may be connected to data center 110 and/or Internet 115. Core layer 105 generally includes 2 switches, each of which is connected with each device in distribution layer 120 for redundancy purposes. (As used herein the term "switch" will be used to mean an actual switch, a router, or any similar network device.) Similarly, each device in wiring closet/access layer 125 is normally connected to two devices of distribution layer 120.

The pairs of switches in the distribution and core layers normally act as peer devices. Typically, network traffic is load balanced between the peers. If one of the peers fails, then all traffic is re-directed to the other switch.

Within switches configured for high availability, there is an "active" supervisor and a "standby" supervisor. The active supervisor is responsible for routing network traffic on the network and maintaining the appropriate routing tables, port index tables, etc. The running configuration file of the active supervisor is typically modified during the operation of the active supervisor. The standby supervisor is available in the event of the failure of the active supervisor.

Merely connecting the active and standby supervisors is not sufficient to allow the standby supervisor to take over the functions of the active supervisor in the event the active supervisor fails. The supervisors must be configured to allow a "switchover" to take place, preferably without causing much (if any) disruption of the network. Examples of some methods and devices for achieving such "high availability" are described, for example, in U.S. patent application Ser. No. 10/156,563, filed May 24, 2002, which is hereby incorporated by reference for all purposes.

In general, the standby supervisor may be configured in a "cold," "warm" or "hot" standby state. Although these terms are not precisely defined, an increase in figurative temperature indicates a relatively higher state of readiness of the standby supervisor. In other words, a standby supervisor operating in a warm state will be able to take over the functions of the active supervisor more quickly than a standby supervisor operating in a cold state. A standby supervisor operating in a warm state may, for example, have its configuration state continuously synchronized to match the running configuration of the active supervisor. A standby supervisor operating in a hot state may, for example, also have its routing tables, port index tables, etc., continuously synchronized to match those of the active supervisor.

Recently, the present assignee has developed methods and devices to form networks that preserve the robust qualities of a conventional network topology, but which are simpler to manage. However, these novel configurations introduce configurations to which former methods of maintaining high availability do not apply. It would be desirable to implement improved mechanisms for maintaining high availability in such networks.

SUMMARY OF THE INVENTION

Methods and devices are provided for implementing high availability. Some implementations provide high availability for virtual switches of data networks. Each virtual switch acts as a single logical unit, while encompassing at least two physical chassis, referred to herein as a master chassis and a slave chassis. In some preferred embodiments, the active supervisor in the master chassis is configured as an active supervisor of the virtual switch and the active supervisor in the slave chassis is configured as the standby supervisor of the virtual switch.

In accordance with one aspect of the invention, a method of providing high availability for a network is disclosed. The method involves configuring a first supervisor in a first chassis of a virtual network device as an active supervisor and configuring a second supervisor in a second chassis of the virtual network device as a standby supervisor for the active supervisor. The active supervisor and the standby supervisor are preferably configured to perform load balancing of traffic for the virtual network device. The second supervisor is preferably kept in a hot standby state.

The first chassis may include a third supervisor configured as a first "pseudo-standby supervisor" preferably kept in at least a warm state by the first supervisor. In one of the preferred implementations, the pseudo-standby is kept in data-plane hot state and control plane in warm state. The method may include performing a stateful switchover in response to a failure of the first supervisor. During a stateful switchover, the second supervisor may be configured as a new active supervisor and the third supervisor may be configured as a new standby supervisor. The first chassis and the second chassis preferably continue forwarding traffic during the stateful switchover. Alternatively, the third supervisor may be configured as a new standby supervisor in response to a failure of the second supervisor.

The method may also include configuring a fourth supervisor of the second chassis as a second pseudo-standby supervisor, which is preferably kept in at least a warm state. The fourth supervisor may be configured as a new standby supervisor in response to a failure of the second supervisor.

If and when the first supervisor is re-booted after it fails, the method may include configuring the first supervisor as a new pseudo-standby supervisor. The new pseudo-standby supervisor is kept in at least a warm state by the third supervisor.

According to some embodiments of the invention, a virtual network device configured for high availability is provided. The virtual network device includes a first chassis comprising a first supervisor configured as an active supervisor and a second chassis comprising a second supervisor configured as a standby supervisor. The second supervisor is preferably configured to act as a new active supervisor in response to a failure by the first supervisor. The first supervisor and the second supervisor are preferably configured to perform load balancing of traffic for the virtual network device.

The first chassis may include a third supervisor configured as a first pseudo-standby supervisor that is preferably kept in at least a warm standby state, e.g., by the first supervisor.

The third supervisor may be configured to act as a new standby supervisor in response to a failure by the first supervisor.

The second chassis may also include a fourth supervisor configured as a second pseudo-standby supervisor that is preferably kept in at least a warm standby state by, e.g., the second supervisor. The fourth supervisor may act as a new standby supervisor in response to a failure by the second supervisor.

Other implementations of the invention provide a computer program embodied in a machine-readable medium. The computer program includes instructions for controlling a virtual network device to configure a first supervisor in a first chassis of the virtual network device as an active supervisor and to configure a second supervisor in a second chassis of the virtual network device as a standby supervisor. The computer program may include instructions for keeping the second supervisor in a hot standby state. The computer program preferably includes instructions for causing the active supervisor and the standby supervisor to perform load balancing of traffic for the virtual network device.

The computer program may include instructions for configuring a third supervisor in the first chassis as a first pseudo-standby supervisor, preferably kept in at least a warm state, e.g., by the first supervisor. The computer program may include instructions for configuring the third supervisor as a new standby supervisor in response to a failure of the second supervisor.

The computer program preferably includes instructions for performing a stateful switchover in response to a failure or manual reset of the first supervisor by controlling the virtual network device to configure the second supervisor as a new active supervisor and to configure the third supervisor as a new standby supervisor. The computer program preferably includes instructions for causing the first chassis and the second chassis to continue forwarding traffic during the stateful switchover.

The computer program may include instructions for causing the virtual network device to perform the following steps when the first supervisor is ready to come back on line: re-booting the first supervisor; and configuring the first supervisor as a new pseudo-standby supervisor, preferably kept in at least a warm state, e.g., by the third supervisor.

The computer program may include instructions for configuring a fourth supervisor of the second chassis as a second pseudo-standby supervisor that is preferably kept in at least a warm state. The computer program may include instructions for configuring the fourth supervisor as a new standby supervisor in response to a failure of the second supervisor.

BRIEF DESCRIPTION OF THE DRAWINGS

FIG. 1 is a network diagram illustrating a conventional network topology.

FIG. 7 illustrates a simplified version of a network device that may be configured to implement some aspects of the present invention.

DETAILED DESCRIPTION OF THE INVENTION

Figure 2A:
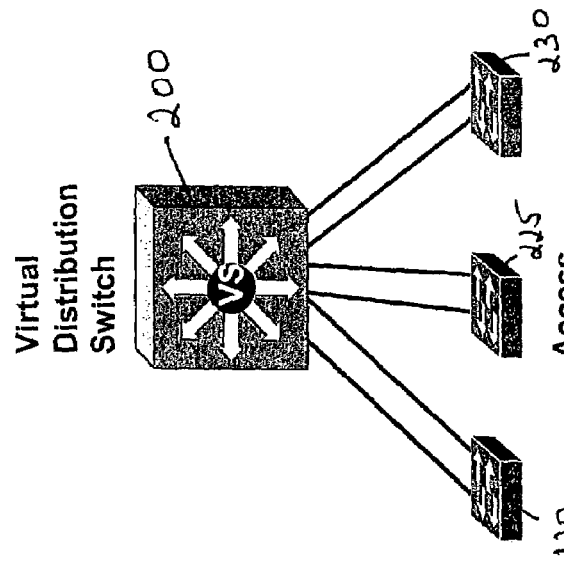
FIGS. 2A and 2B provide a simplified illustration of forming a virtual switch.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Although the present invention has broad application, some preferred embodiments are directed to providing high availability in the context of a novel "virtual switch" that has been developed by Cisco Systems, Inc. Details of the virtual switch are described in U.S. patent application Ser. No. 10/666,306, which application is hereby incorporated by reference for all purposes. This virtual switch application is being filed on the same day as the present application.

Overview of the Virtual Switch

Each virtual switch acts as a single logical unit, while encompassing at least two physical chassis. (As noted above, the term "switch" as used herein will apply to switches, routers and similar network devices.) Each virtual switch includes a master chassis and at least one slave chassis. The master chassis is configured to control the slave chassis.

Within the virtual switch, there is only 1 master supervisor, which will be referred to herein as the "virtual switch active" or VS active supervisor. The master supervisor provides a single management point to the user. The chassis containing the master supervisor is referred to as the master chassis. The other chassis forming the virtual switch are referred to as (a) slave chassis. The active supervisor in the slave chassis will act as a subordinate of the master supervisor.

According to preferred embodiments of the invention, the active supervisor in the slave chassis will serve as a standby to the master supervisor in case of failure. A supervisor so configured will be referred to herein as a "virtual switch standby" or VS standby supervisor.

Each chassis has at least one supervisor that acts as the active supervisor for that chassis, which will be referred to herein as the "chassis active" supervisor. A chassis may have an additional supervisor, which will be referred to herein as a "chassis standby" supervisor. The invention does not preclude having additional supervisors in the chassis.

If only 1 supervisor is present in the chassis, the entire chassis will be lost on failure but the virtual switch will continue as if those ports on the failed chassis were subject to an online insertion and removal ("OIR") event. All of the interfaces present on both of the chassis will appear to the user as 1 large switch. The port addressing is a single global space where each layer 2 ("L2") interface within the virtual switch has a unique port index.

The software image for the virtual switch should be configured on the master supervisor and downloaded to all of the other supervisors. This ensures that the entire virtual switch will always run the same software image version.

Exemplary Embodiments of the Virtual Switch

FIG. 2A is a network diagram that depicts a high-level physical view of virtual switch 200 according to some embodiments of the invention. In this embodiment, virtual switch 200 includes distribution layer switches 205 and 210, which are in communication via virtual switch link 215. In some preferred embodiments, virtual switch link 215 is an Etherchannel port bundle that is run according to a proprietary virtual switch link protocol. Access layer devices 220, 225 and 230 are physically connected to each of distribution layer switches 205 and 210.

Figure 2B:
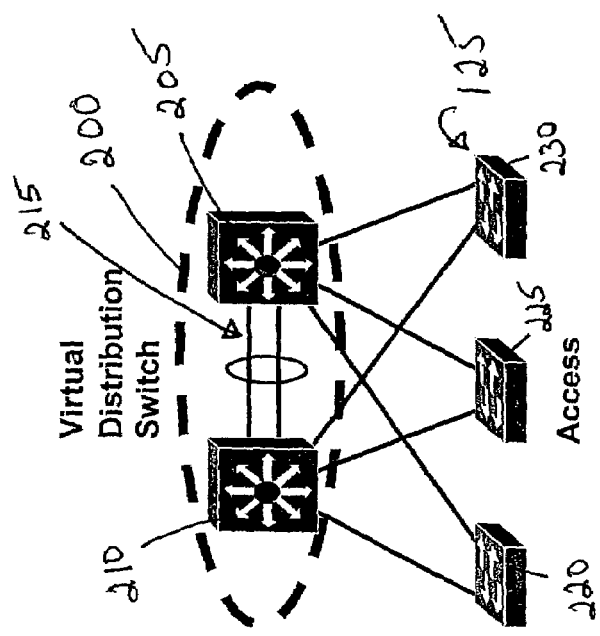

FIG. 2B depicts a logical view of virtual switch 200. Access layer devices 220, 225 and 230, though physically connected to each of distribution layer switches 205 and 210, interact with virtual switch 200 as if it were a single network device. All devices external to virtual switch 200 view it as a single network device. At layer 3, virtual switch 200 acts as a single router to access layer 125 and core layer 105. Similarly, at layer 2, virtual switch 200 acts as a single switch to access layer 125 and core layer 105. The two configuration points of distribution layer switches 205 and 210 may be treated as a single configuration point.

Although virtual switch 200 is formed at the distribution layer in the foregoing example, virtual switch 200 may be formed in other parts of a network, e.g., at the core layer. Moreover, according to some embodiments, a virtual switch 200 formed at the distribution layer also includes devices in access layer 125. According to some such embodiments, the access layer devices that are in communication with virtual switch 200 do not make independent forwarding decisions (regarding access control lists ("ACLs), quality of service ("QoS"), etc.). In such embodiments, the access layer devices act as remote dumb linecards (sometimes referred to herein as "satellites") to the devices in the distribution layer. Accordingly, virtual switch 200 can include both devices in the distribution layer and devices in the access layer. Such embodiments of virtual switch 200 create a single point of management for both the access and distribution layers.

Figure 3:
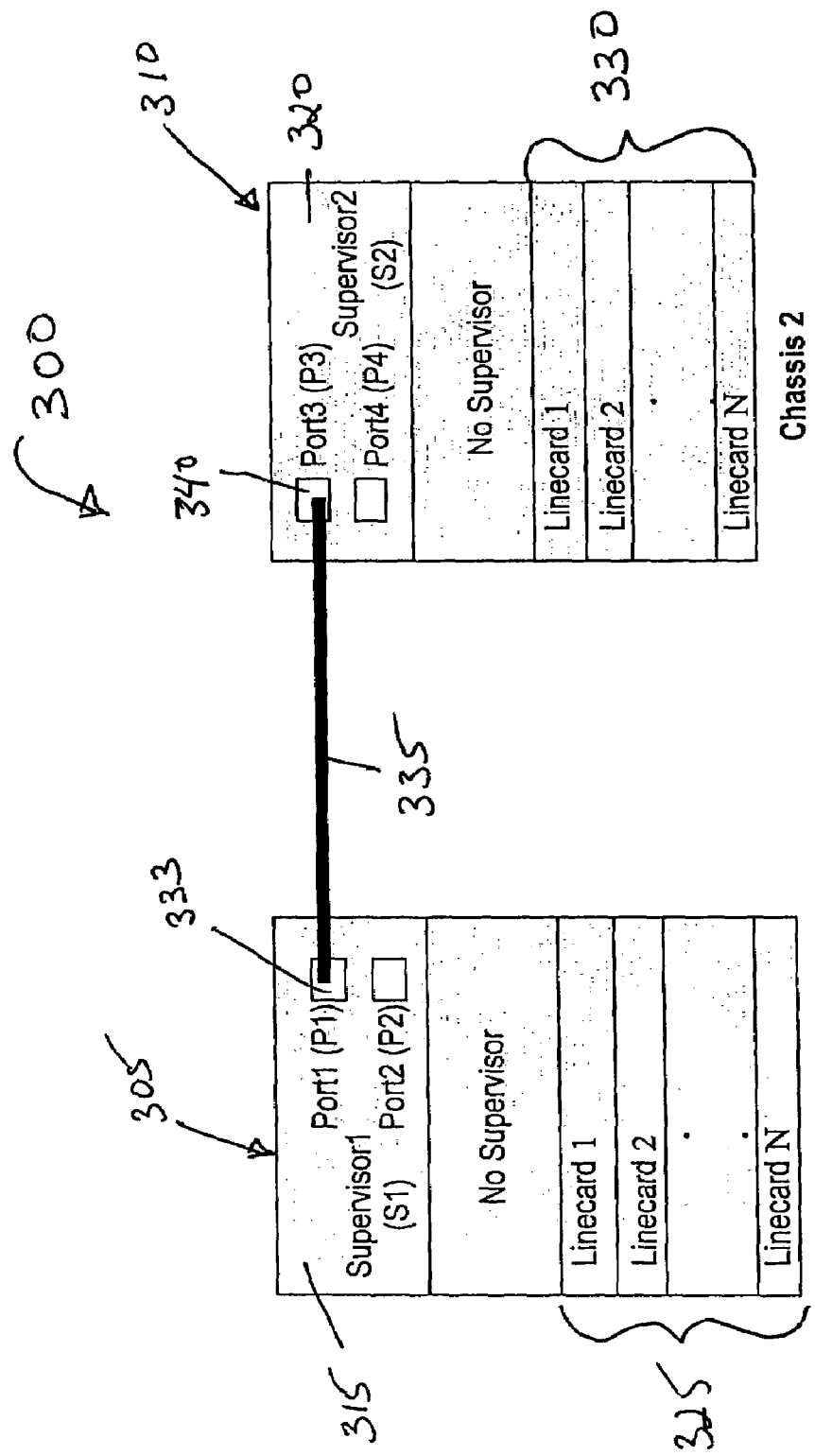
FIG. 3 illustrates a minimal hardware configuration for implementing the present invention in a virtual switch.

A minimal hardware deployment scenario is illustrated in FIG. 3. In scenario 300, master chassis 305 has a single supervisor card 315 and a plurality of linecards 325. Similarly, slave chassis 310 has a single supervisor card 320 and a plurality of linecards 330. Link 335 is formed between port 333 of supervisor 315 and port 340 of supervisor 320. The principal advantages of scenario 300 are minimal cost and minimal configuration time. The disadvantages include a lack of redundancy, in that the failure of any component may create an outage. Accordingly, scenario 300 is not robust, as compared to other possible deployment scenarios.

However, some aspects of the present invention may nonetheless be implemented in scenario 300. Here, supervisor card 315 will be the VS active supervisor and supervisor card 320 will be the VS standby supervisor. Both the VS active supervisor and the VS standby supervisor are involved in the routing of network traffic, as described in detail in co-pending application Ser. No. 10/666,306. The VS active supervisor keeps the VS standby supervisor synchronized via link 335. Upon failure of supervisor card 315, supervisor card 320 will be the new VS active supervisor. In preferred embodiments, when supervisor card 315 is brought back online, supervisor card 315 will be the new VS standby supervisor.

Figure 4:
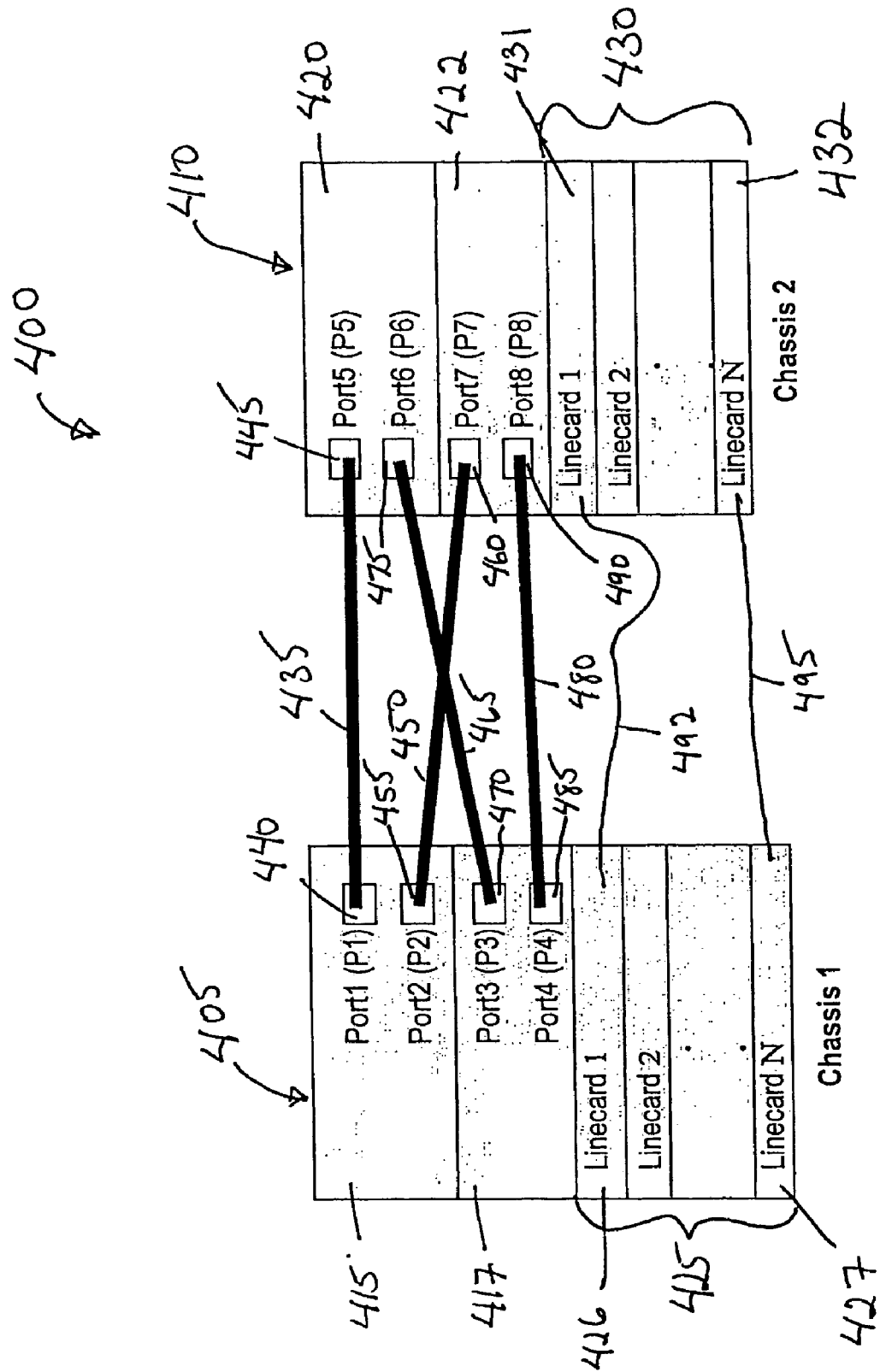
FIG. 4 illustrates a more robust hardware configuration for implementing the present invention in a virtual switch.

A more robust deployment scenario 400 is illustrated in FIG. 4. Master chassis 405 includes master supervisor 415, stand-by supervisor 417 and linecards 425. Slave chassis 410 includes slave supervisor 420, stand-by slave supervisor 422 and linecards 430.

In this scenario, both chassis contain 2 supervisors and there are 4 physical links between the supervisors and two physical links between the linecards all of which are bundled to form the inter chassis Virtual switch link: link 435 connects ports 440 and 445; link 450 connects ports 455 and 460; link 465 connects ports 470 and 475; and link 480 connects ports 485 and 490. Link 492 connects linecard 426 of master chassis 405 with linecard 431 of slave chassis 410. Link 495 connects linecard 427 of master chassis 405 with linecard 432 of slave chassis 410.

Deployment scenario 400 has the advantage of much greater redundancy than deployment scenario 300. Having supervisor redundancy on both chassis, with a physical link between each of the 4 supervisors, creates a much more robust physical link scenario: deployment scenario 400 allows the virtual switch to operate even after a number of 3-failure scenarios. The disadvantages of deployment scenario 400 include higher cost.

As above, supervisor 415 is the VS master supervisor and slave supervisor 420 is the VS standby supervisor. Master chassis stand-by supervisor 417 and slave chassis stand-by supervisor 422 are preferably configured as VS "pseudo-standby" supervisors. These VS pseudo-standby supervisors are kept synchronized to varying degrees, according to different implementations of the invention.

According to some preferred implementations, the VS pseudo-standby supervisors are kept in a "dataplane hot" standby state, wherein the appropriate routing tables, port index tables, etc., of the VS pseudo-standby supervisors are kept synchronized with those of the VS master supervisor. In one such implementation, upon failure of master supervisor 415, a stateful switchover is performed, wherein slave supervisor 420 becomes the new VS active supervisor and master chassis stand-by supervisor 417 becomes the new VS standby supervisor. If master chassis stand-by supervisor 417 has been kept in a dataplane hot standby state, this stateful switchover can be accomplished with no loss of traffic during the switchover.

However, in alternative embodiments, the VS pseudo-standby supervisors are kept in a "dataplane warm" state, wherein there may be some loss of traffic during a switchover when, e.g., slave supervisor 420 becomes the new VS active supervisor and master chassis stand-by supervisor 417 becomes the new VS standby supervisor. Although the VS pseudo-standby supervisors may also be kept in a "dataplane cold" state in some implementations, such implementations are not preferred because of the network disruption that will ensue upon failure of the VS active supervisor. Similarly, the control planes of the VS pseudo-standby supervisors may be kept in any state, but are preferably kept in at least a "control plane warm" state wherein the VS pseudo-standby supervisors are synchronized with chassis-specific state information.

Preferably, the VS pseudo-standby supervisors are locally synchronized. In other words, VS pseudo-standby supervisor 417 is preferably kept synchronized by master supervisor 415 and VS pseudo-standby supervisor 422 is preferably kept synchronized by slave supervisor 420.

After master supervisor 415 fails and slave supervisor 420 has become the new VS active supervisor, there will be times when slave supervisor 420 will also fail. According to some implementations of the invention, supervisor 417 then becomes the new VS active supervisor and supervisor 422 becomes the new VS standby supervisor.

Virtual switches configured according to preferred aspects of the invention are advantageous because on a switchover there will be little or no disruption of traffic. This is true in part because on a switchover, the virtual switch standby does not need to resynchronize its hardware. Because the virtual switch standby has already been forwarding traffic, there is a higher confidence level for the virtual switch standby to take over properly upon switchover. In the prior art single-chassis architecture, a standby supervisor would not be involved with forwarding prior to switchover.

Sometimes slave supervisor 420 will be the first supervisor to fail. If so, supervisor 422 preferably becomes the new VS standby supervisor and also becomes the active supervisor for the slave chassis. If and when slave supervisor 420 boots up again, slave supervisor 420 will preferably become a slave chassis standby supervisor and a VS pseudo-standby supervisor.

If supervisor 417 is the first supervisor to fail, supervisor 422 will become the new VS standby supervisor if supervisor 415 also fails. This is not a preferred scenario, because the new VS active supervisor (supervisor 420) and the new VS standby supervisor (supervisor 422) would then be disposed in the same chassis. However, because both of the supervisors in the former master chassis would have failed, this scenario makes use of the only remaining supervisors for implementing a high-availability configuration.

Figure 5:
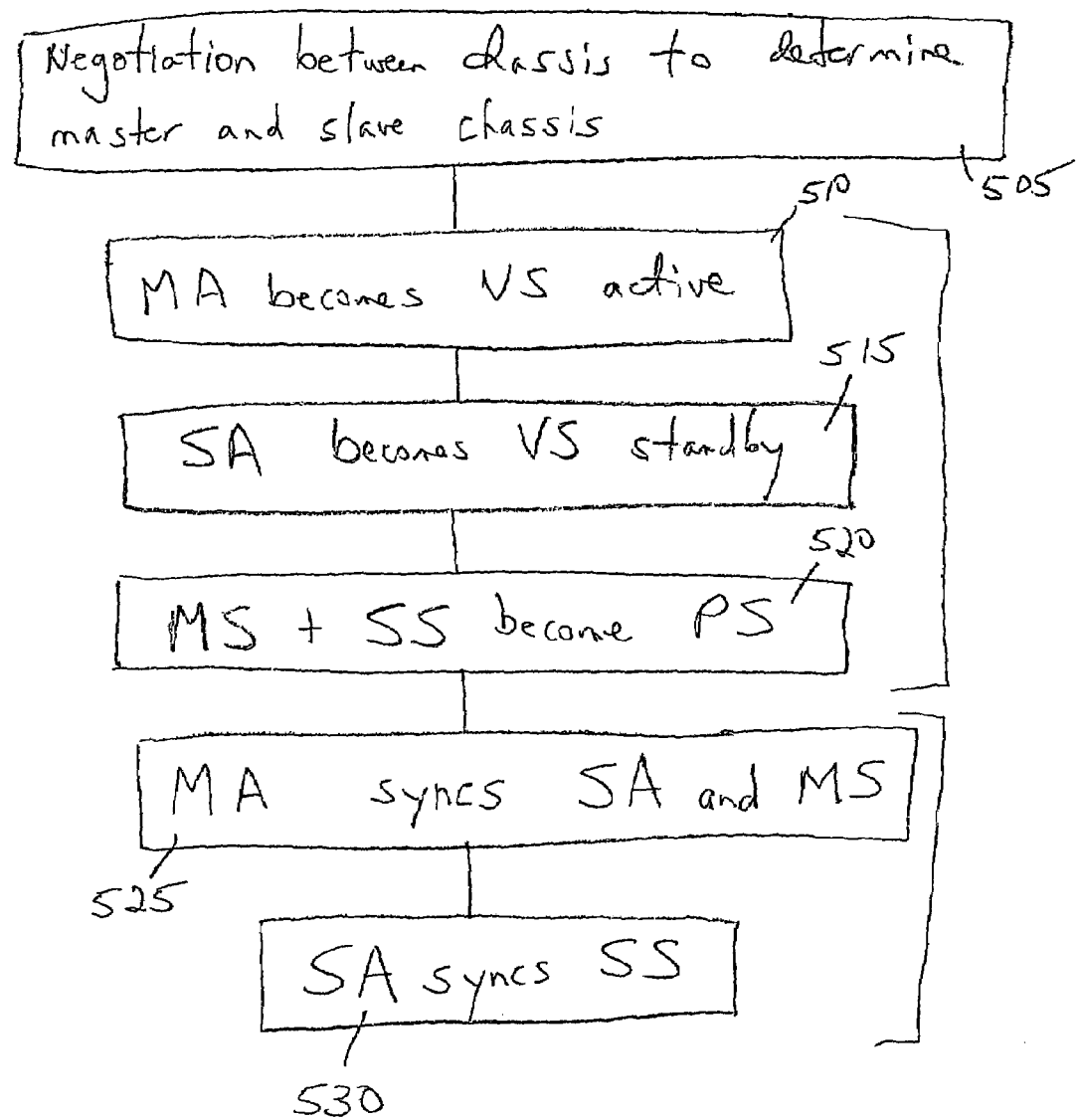
FIG. 5 is a flow chart that outlines a method according to the present invention.

FIG. 5 outlines one method of the invention. FIG. 5 refers to a virtual switch having one of the various configurations described above, wherein there will be a VS active supervisor in a master chassis and a VS standby supervisor in a slave chassis.

In step 505, there is a negotiation between the chassis that make up the virtual switch to determine which chassis will be the master chassis. After the master chassis is determined, the active supervisor in the master chassis becomes the VS active supervisor (step 510) and the active supervisor in the slave chassis becomes the VS standby supervisor (step 515). If there are more than two supervisors in the virtual switch, a standby supervisor in the master chassis becomes a VS pseudo-standby supervisor (step 520). Although steps 510 through 520 are shown in series, they are preferably performed in parallel.

In step 525, the VS active supervisor synchronizes both the VS standby supervisor and the standby supervisor in the master chassis, if any. Similarly, the VS standby supervisor synchronizes the standby supervisor in the slave chassis, if any. Although steps 525 and 530 are shown in series, they are preferably performed in parallel.

Figure 6A:
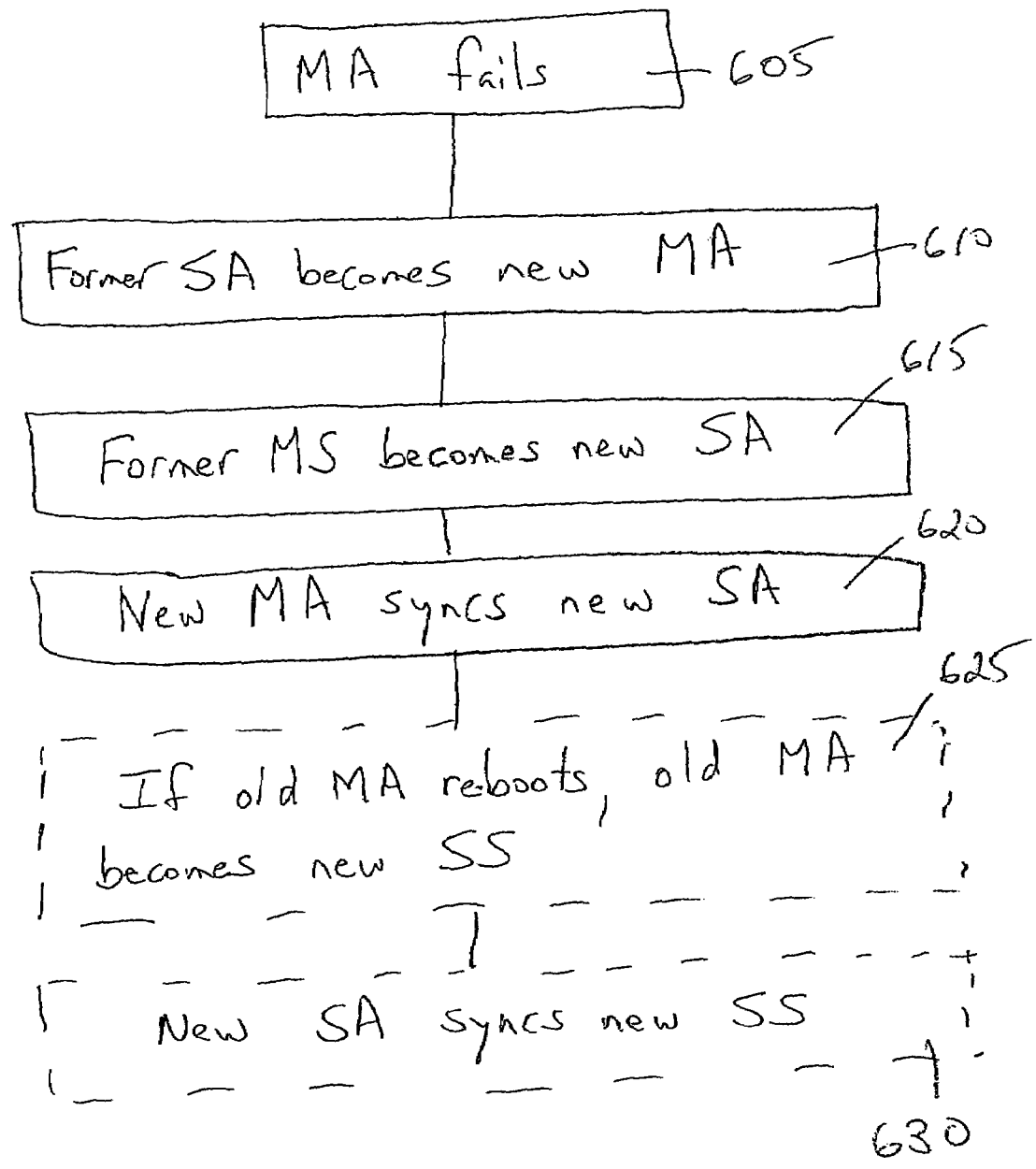
FIGS. 6A, 6B, 6C and 6D are flow charts that outline alternative methods according to the present invention.

FIG. 6A depicts a situation in which the VS active supervisor fails (step 605), according to one aspect of the invention. The former VS standby supervisor becomes the new VS active supervisor (step 610). If, as in preferred implementations, the former VS standby supervisor was in a slave chassis, the former slave chassis becomes the new master chassis. The former master chassis standby supervisor becomes the new slave active supervisor (step 615). The new VS active supervisor synchronizes the new slave active supervisor (step 620). As above, steps 610 through 620 preferably take place at approximately the same time.

If the former master active supervisor re-boots, it will come online as a new slave standby supervisor (step 625) and will preferably be locally synchronized by the active slave supervisor (step 630).

Figure 6B:
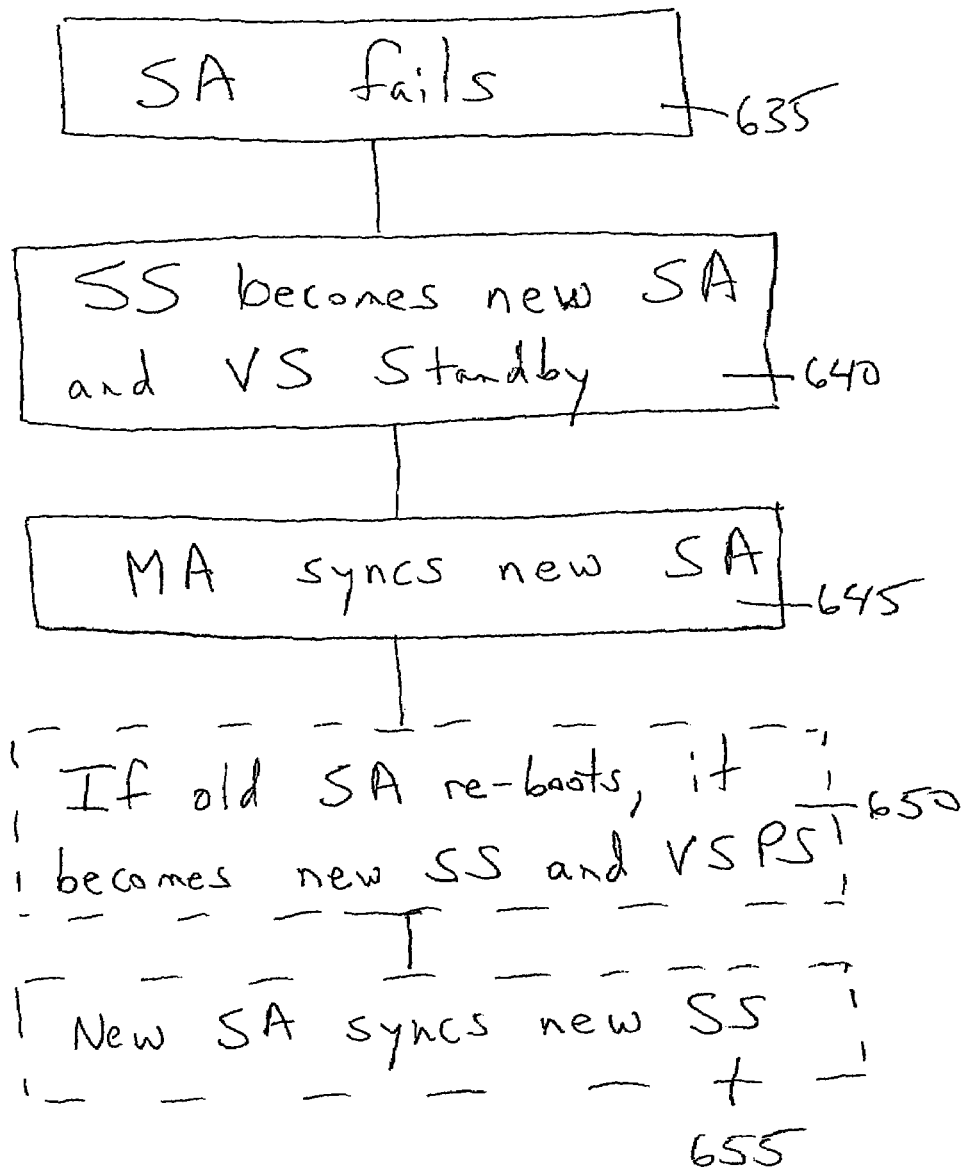

FIG. 6B outlines a scenario in which the VS standby (slave active) supervisor fails (step 635), according to one implementation of the invention. The former slave chassis standby supervisor becomes the new slave active and VS standby supervisor (step 640). The VS active supervisor synchronizes the new VS standby supervisor (step 645). If the former slave active supervisor re-boots, it will be the new slave standby and VS pseudo-standby supervisor (step 650) and will preferably be locally synchronized by the slave active supervisor (step 655).

Figure 6C:
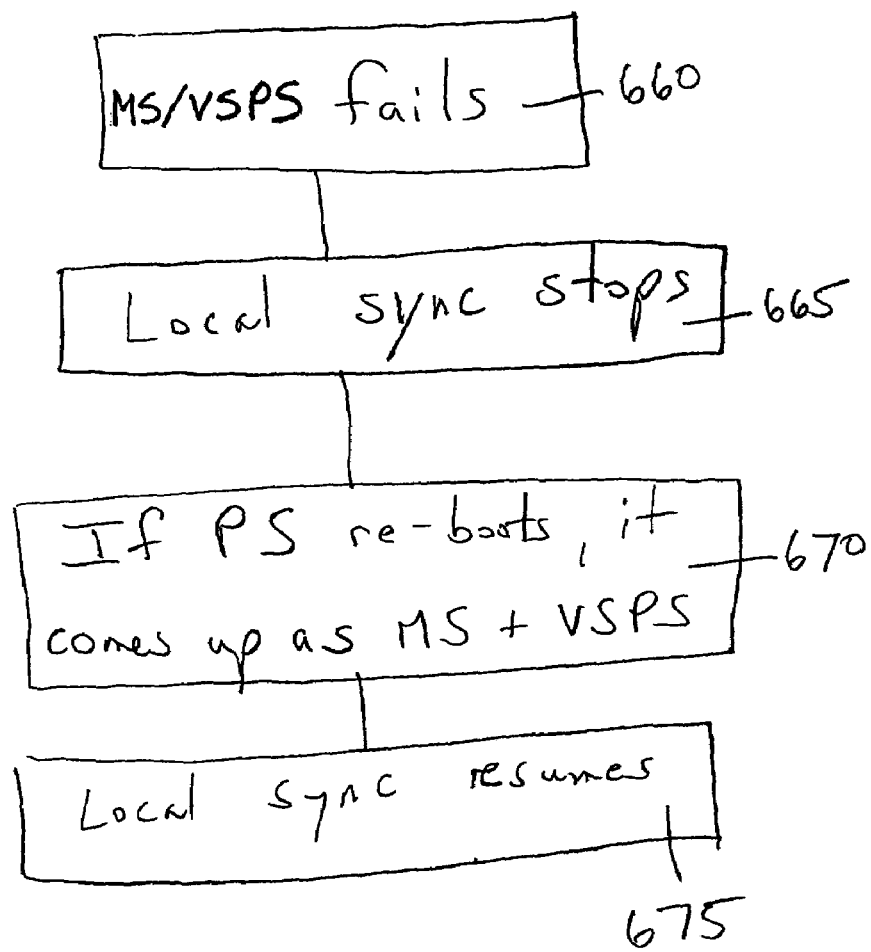

FIG. 6C is a flow chart that depicts the steps taken when the master standby/VS pseudo-standby supervisor fails (step 660), according to one implementation of the invention. The local synchronization of the master standby supervisor stops (step 665). If the supervisor re-boots, it becomes a master standby/VS pseudo-standby supervisor once again (step 670). The local synchronization of the master standby supervisor resumes (step 675).

Figure 6D:
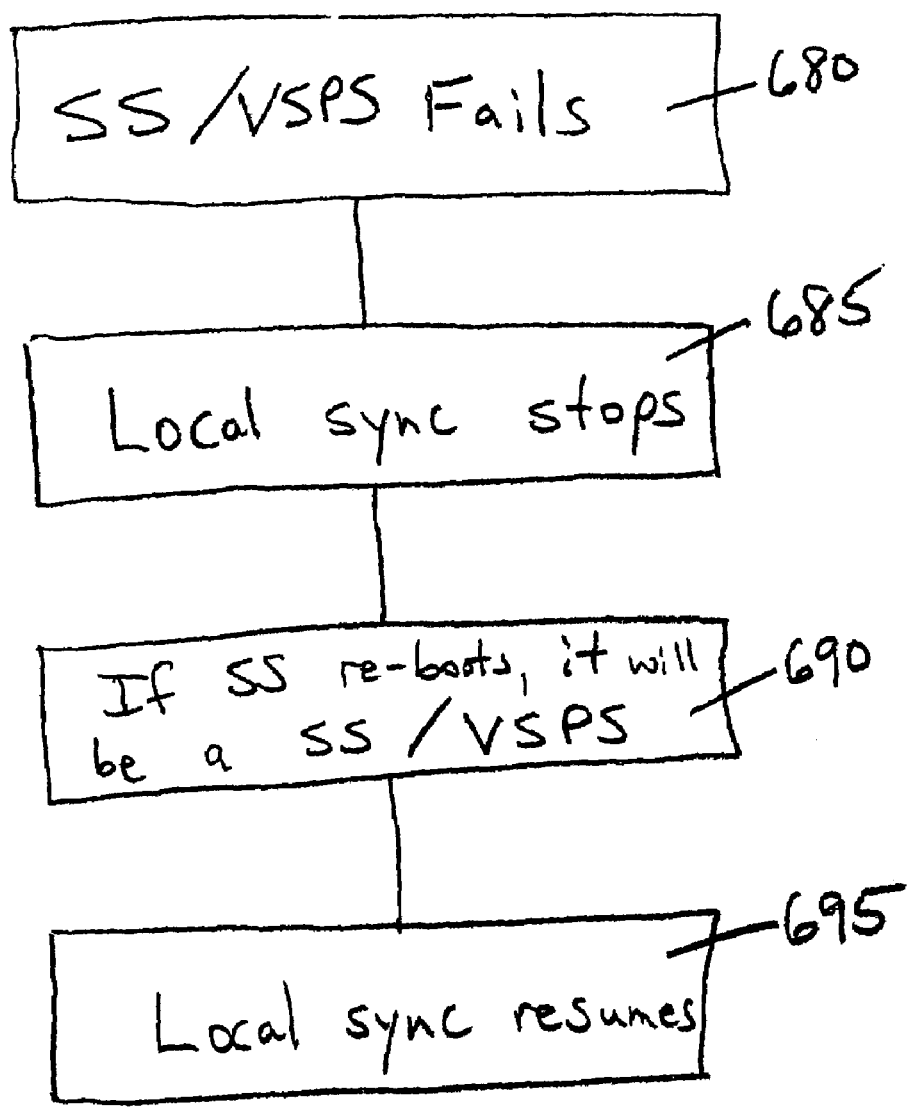

FIG. 6D is a flow chart that depicts the steps taken when the slave standby/VS pseudo-standby supervisor fails (step 680), according to another implementation of the invention. The local synchronization of the slave standby supervisor stops (step 685). If the supervisor re-boots, it becomes a slave standby/VS pseudo-standby supervisor once again (step 690). The local synchronization of the slave standby supervisor then resumes (step 695).

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "linecards"). Generally, interfaces 768 control the sending and receiving of data packets over the network and sometimes support other peripherals used with the network device 760. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g., Cisco IOS, a proprietary operating system developed by Cisco Systems, Inc., etc.) and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 7) or switch fabric based (such as a cross-bar).

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, the network device described above with reference to FIG. 7. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Although illustrative embodiments and applications of this invention are shown and described herein, many variations and modifications are possible which remain within the concept, scope, and spirit of the invention, and these variations would become clear to those of ordinary skill in the art after perusal of this application.

For instance, according to some implementations of the invention, the master chassis and the slave chassis are configured to operate at no more than half of their capacity for handling network traffic under normal circumstances. In such embodiments, even if an entire chassis fails, network traffic continues to be processed at the same rate after such failure.

Accordingly, the present embodiments are to be considered as illustrative and not restrictive, and the invention is not to be limited to the details given herein, but may be modified within the scope and equivalents of the appended claims.

We claim:

1. A method of providing high availability for a network, the method comprising:
   configuring a first supervisor in a first chassis of a virtual network device as an active supervisor;
   configuring a second supervisor in a second chassis of the virtual network device as a standby supervisor for the virtual network device; and
   configuring a third supervisor as first pseudo-standby supervisor kept in a warm state.

2. The method of claim 1, wherein the active supervisor and the standby supervisor are further configured to perform load balancing of traffic for the virtual network device.

3. The method of claim 1, wherein the third supervisor is configured in the first chassis.

4. The method of claim 3, wherein a stateful switchover is performed in response to a failure of the first supervisor and the method further comprises:
   configuring the second supervisor as a new active supervisor; and
   configuring the third supervisor as a new standby supervisor.

5. The method of claim 3, further comprising configuring the third supervisor as a new standby supervisor in response to a failure of the second supervisor.

6. The method of claim 3, further comprising configuring a fourth supervisor of the second chassis as a second pseudo-standby supervisor kept in a warm state.

7. The method of claim 4, wherein the first chassis and the second chassis continue forwarding traffic during the stateful switchover.

8. The method of claim 5, further comprising:
   re-booting the first supervisor; and
   configuring the first supervisor as a new pseudo-standby supervisor kept in a warm state.

9. The method of claim 6, further comprising configuring the fourth supervisor as a, new standby supervisor in response to a failure of the second supervisor.

10. The method of claim 1, further comprising keeping the second supervisor in a hot standby state.

11. A virtual network device configured for high availability, the virtual network device comprising:
    a first chassis comprising a first supervisor configured as an active supervisor;
    a second chassis comprising a second supervisor configured as a standby supervisor; and
    wherein the first chassis further comprises a third supervisor configured as a first pseudo-standby supervisor that is kept in a warm standby state by the first supervisor.

12. The virtual network device of claim 11, wherein the first supervisor and the second supervisor are further configured to perform load balancing of traffic for the virtual network device.

13. The virtual network device of claim 11, wherein the second chassis further comprises a fourth supervisor configured as a second pseudo-standby supervisor that is kept in a warm standby state by the second supervisor.

14. The virtual network device of claim 13, wherein the fourth supervisor is further configured to act as a new standby supervisor in response to a failure by the second supervisor.

15. The virtual network device of claim 11, wherein the second supervisor is further configured to act as a new active supervisor in response to a failure by the first supervisor.

16. The virtual network device of claim 11, wherein the third supervisor is further configured to act as a new standby supervisor in response to a failure by the first supervisor.

17. A computer program embodied in a machine-readable medium, the computer program comprising instructions for controlling a virtual network device to perform the following steps:
   configuring a first supervisor in a first chassis of a virtual network device as an active supervisor;
   configuring a second supervisor in a second chassis of the virtual network device as a standby supervisor for the virtual network device; and
   configuring a third supervisor as first pseudo-standby supervisor kept in a warm state.

18. The computer program of claim 17, further comprising instructions for causing the active supervisor and the standby supervisor to perform load balancing of traffic for the virtual network device.

19. The computer program of claim 17, further comprising instructions for configuring a third supervisor in the first chassis as a first pseudo-standby supervisor kept in a warm state by the first supervisor.

20. The computer program of claim 19, further comprising instructions for configuring a fourth supervisor of the second chassis as a second pseudo-standby supervisor kept in a warm state.

21. The computer program of claim 20, further comprising instructions for configuring the fourth supervisor as a new standby supervisor in response to a failure of the second supervisor.

22. The computer program of claim 19, further comprising instructions for performing a stateful switchover in response to a failure of the first supervisor by controlling the virtual network device to perform the following steps:
   configuring the second supervisor as a new active supervisor; and
   configuring the third supervisor as a new standby supervisor.

23. The computer program of claim 19, further comprising instructions for configuring the third supervisor as a new standby supervisor in response to a failure of the second supervisor.

24. The computer program of claim 22, further comprising instructions for causing the first chassis and the second chassis to continue forwarding traffic during the stateful switchover.

25. The computer program of claim 22, further comprising instructions for causing the virtual network device to perform the following steps:
   re-booting the first supervisor; and
   configuring the first supervisor as a new pseudo-standby supervisor kept in a warm state by the third supervisor.

26. The computer program of claim 17, further comprising instructions for keeping the second supervisor in a hot standby state.

27. An apparatus for providing high availability for a network, the apparatus comprising:
   means for configuring a first supervisor in a first chassis of a virtual network device as an active supervisor;
   means for configuring a second supervisor in a second chassis of the virtual network device as a standby supervisor for the virtual network device; and
   means for configuring a third supervisor as first pseudo-standby supervisor kept in a warm state.

* * * * *